(12) United States Patent
Angamuthu et al.

(10) Patent No.: US 7,664,986 B2
(45) Date of Patent: *Feb. 16, 2010

(54) SYSTEM AND METHOD FOR DETERMINING FAULT ISOLATION IN AN ENTERPRISE COMPUTING SYSTEM

(75) Inventors: Karthikeyan Angamuthu, Austin, TX (US); Robert V. Cox, Austin, TX (US); Stephanos S. Heracleous, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/031,125

(22) Filed: Feb. 14, 2008

(65) Prior Publication Data

US 2008/0133978 A1 Jun. 5, 2008

Related U.S. Application Data

(63) Continuation of application No. 10/394,348, filed on Mar. 20, 2003, now Pat. No. 7,340,649.

(51) Int. Cl.
*G06F 11/00* (2006.01)

(52) U.S. Cl. .......................... 714/27; 714/26; 709/220; 709/221

(58) Field of Classification Search .................. 714/26, 714/27; 702/182–185; 709/220, 221
See application file for complete search history.

(56) References Cited

U.S. PATENT DOCUMENTS

| | | | |
|---|---|---|---|
| 5,130,936 A | 7/1992 | Sheppard et al. | 364/551.01 |
| 5,528,516 A | 6/1996 | Yemini et al. | 364/551.01 |
| 5,838,918 A | 11/1998 | Prager et al. | 395/200.51 |
| 5,850,386 A | 12/1998 | Anderson et al. | 370/241 |
| 5,850,388 A | 12/1998 | Anderson et al. | 270/252 |
| 5,893,083 A * | 4/1999 | Eshghi et al. | 706/45 |
| 6,012,152 A | 1/2000 | Douik et al. | 714/26 |
| 6,219,626 B1 | 4/2001 | Steinmetz et al. | 702/183 |
| 6,249,755 B1 | 6/2001 | Yemini et al. | 702/183 |
| 6,304,982 B1* | 10/2001 | Mongan et al. | 714/38 |
| 6,345,239 B1 | 2/2002 | Bowman-Amuah | 703/6 |

(Continued)

OTHER PUBLICATIONS

Compaq White Paper, "The Compaq Enterprise Network Storage Architecture: An Overview" at internet address http://h18000.www1.hp.com/products/storaqeworkds/library/whitepapers/12L8-0500A-WWEN.html, 22 pages, Publication, May 2000.

*Primary Examiner*—Philip Guyton
(74) *Attorney, Agent, or Firm*—Baker Botts L.L.P.

(57) ABSTRACT

A system and method for determining fault isolation in an enterprise computing system is disclosed. A method includes automatically troubleshooting errors in an enterprise computing system that receives at an analyzer engine a status notification from a first component. In response to receiving the status notification, the method automatically selects a first analyzer policy file from a set of analyzer policy files based on the status notification received at the analyzer engine, wherein the analyzer policy file contains troubleshooting logic for determining root causes for errors. The method automatically attempts to communicate with a second component based on the troubleshooting logic within the first analyzer policy file. The method automatically determines a root cause for the status notification based on the troubleshooting logic in the selected analyzer policy file and based on information obtained in connection with the attempt to communicate with the second component.

17 Claims, 2 Drawing Sheets

U.S. PATENT DOCUMENTS

| | | | |
|---|---|---|---|
| 6,415,395 B1 * | 7/2002 | Varma et al. | 714/37 |
| 6,427,132 B1 | 7/2002 | Bowman-Amuah | 703/22 |
| 6,442,694 B1 | 8/2002 | Bergman et al. | 713/201 |
| 6,460,070 B1 * | 10/2002 | Turek et al. | 709/202 |
| 6,529,954 B1 | 3/2003 | Cookmeyer, II et al. | 709/224 |
| 6,622,264 B1 * | 9/2003 | Bliley et al. | 714/26 |
| 6,681,344 B1 * | 1/2004 | Andrew | 714/38 |
| 6,697,969 B1 | 2/2004 | Merriam | 714/46 |
| 6,715,103 B1 * | 3/2004 | Nagai | 714/25 |
| 6,983,362 B1 * | 1/2006 | Kidder et al. | 713/1 |
| 2003/0126501 A1 | 7/2003 | Musman | 714/26 |
| 2004/0078667 A1 * | 4/2004 | Salem | 714/26 |

* cited by examiner

SYSTEM AND METHOD FOR DETERMINING FAULT ISOLATION IN AN ENTERPRISE COMPUTING SYSTEM

RELATED APPLICATIONS

This application is a Continuation of application Ser. No. 10/394,348 filed Mar. 20, 2003, now U.S. Pat. No. 7,340,649. The contents of this application is incorporated herein in it's entirety by this reference.

TECHNICAL FIELD

This disclosure relates in general to the field of enterprise systems. In particular, the present disclosure involves a system and method for determining fault isolation in an enterprise computing system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An enterprise computing system, or enterprise system, is one example of an information handling system. In general, the enterprise system includes several computer components that are interconnected to serve the different needs of a business or organization as opposed to a single user or application. For example, an enterprise system such as a storage area network (SAN) may include a network of servers and storage devices such as hard disk and tape drives that allows data to move between the components by various interconnections.

As such, the SAN may incorporate a very complex topology. Because of this complex topology, network administrators frequently encounter problems while performing diagnostics in an attempt to determine the cause of a fault or problem in the enterprise system. Examples of faults in a storage array include cable failures, unplugged switches or host bus adapters (HBAs), and driver failures.

Typically, when a fault occurs, the enterprise system receives a status notification and may, depending on the set up of the system, cause an alert message to be sent to a network administrator. For example, the alert message is sent to a network administration via a paging system regarding the status notification. The message, however, merely informs the administrator about the status and, typically, does not include information regarding the actual problem. The network administrator must then begin to diagnosis the cause of the problem.

Currently, the administrator relies on error logs to diagnosis the problem. The error logs may be stored in a central computer, but may also be resident on individual computers. Thus, the administrator generally undergoes some detective work to research and collect the errors associated with the problem.

Because large enterprise systems such as a SAN may include many computer components, the administrator may need to review extensive error logs before locating the errors associated with the problem. Depending on the skill of the administrator or the difficulty of the problem, the administrator may spend several hours attempting to correlate the errors with the actual problem to determine the root cause of the error.

SUMMARY

In accordance with teachings of the present disclosure, a system and method for determining fault isolation in an enterprise system are disclosed that provide significant advantages over prior developed techniques. The disclosed embodiments provide an efficient methodology for identifying and providing corrective steps to resolve errors in an enterprise computing system.

According to one aspect of the present disclosure, a method incorporating the teaching of the present disclosure includes a method for automatically troubleshooting errors in an enterprise computing system. The method receives at an analyzer engine a status notification from a first component within the enterprise computing system. In response to receiving the status notification, the method automatically selects a first analyzer policy file from a set of analyzer policy files based on the status notification received at the analyzer engine, wherein the analyzer policy file contains troubleshooting logic for determining root causes for errors in the enterprise computing system. The method automatically attempts to communicate with a second component of the enterprise computing system based on the troubleshooting logic within the first analyzer policy file. The method automatically determines a root cause for the status notification based on the troubleshooting logic in the selected analyzer policy file and based on information obtained in connection with the attempt to communicate with the second component of the enterprise computing system.

According to another aspect of the present disclosure, a computer-readable medium having computer-executable instructions for performing a method including receiving an error notification at a fault isolation engine within an enterprise computing system. Based on the error notification, the method automatically retrieves troubleshooting logic from an analyzer policy file based on the error notification. Upon retrieving the logic, the method automatically selects one or more analyzer modules from a set of analyzer modules based on the troubleshooting logic in the analyzer policy file, wherein the analyzer module contains a diagnosis protocol for testing a computer component or utility within the enterprise computing system. The method automatically attempts to test the computer component or utility based on the diagnosis protocol contained in the analyzer module such that test data is received at the fault isolation engine. In response to receiving the test data, the method automatically determining a root cause for the error notification based on the test data.

According of a further aspect of the present disclosure, a fault isolation troubleshooting system includes an analyzer module selected from a set of analyzer modules. Each analyzer module contains a diagnosis protocols operable to gather information from a computer component for determining a root cause of a fault, wherein the diagnosis protocol provides instructions to test one or more computer components. The system also includes an analyzer policy file selected from a set of analyzer policy files. Each analyzer policy file contains troubleshooting logic for selecting the analyzer module. The system further includes an analyzer engine operable to utilize a status notification for selecting the analyzer policy file, such that the analyzer engine utilizes the information from the computer component to either return a determination of the root cause of the fault or to select another analyzer policy file.

The disclosed system and method provide several technical advantages over conventional approaches for troubleshooting errors in an enterprise computing system. For example, automatically troubleshooting errors in an enterprise system provides a network administrator a simple and efficient means to correct problems. Because the method incorporates analyzer modules that are selected based on an error, an analyzer engine may be able to determine what caused the error. In some instances, the method provides a corrective action that the administrator may follow to correct the problem.

Other technical advantages will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any-other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
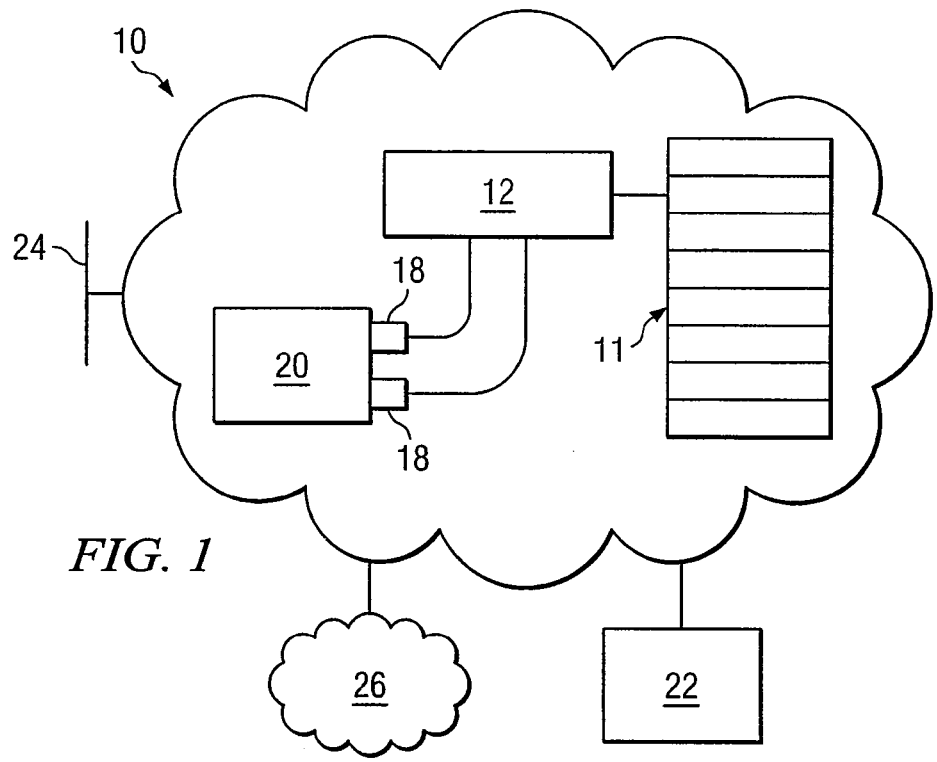
FIG. 1 is a block representation of an enterprise computing system according to an example embodiment of the present disclosure.

FIG. 1 is a block representation of enterprise computing system 10. One example of enterprise computer system 10 includes a storage area network (SAN) that interconnects various computer components to move data between server 20 and storage resources 11.

Typically, a SAN includes storage resources 11, switch 12, host bus adapters 18 and servers 20. Storage resources 11 such as a storage array may also include hard disks, RAID array, tape drive or similar devices to store data. Generally in large SAN, several storage resources 11 are interconnected via a network. An example of storage resource 11 includes a PowerVault 660F Storage Array manufactured by Dell Computer Corporation.

Switch 12 allows the computer components to provide communications with the different components connected to enterprise computing system 10. As such, switch 12 acts as a hub that provides a common connection for separate communications lines in a network. In general, switch 12 operates to forward communications to a particular device in enterprise computing system 10 based on a port address associated with the device. In one instance, switch 12 interconnects one or more storage resources 11 with one or more servers 20.

Host bus adapters (HBAs) 18 operate to handle controller specific aspects of a device driver by interfacing between a target driver and the disk controller. For example, when a request is received to retrieve information from a specific location in storage resource 11, HBA 18 acts as the interface by reading the information and passing on the results to the target driver. Typically, HBAs 18 interface between server 20 and storage resource 11 via switch 12.

Server 20 may form a part of the SAN that responds to commands from users or clients 26 on enterprise computing system 10. In some instances, clients 26 may access server 20 via the Internet or from a local area connection (LAN) 24.

A network administrator may connect to enterprise computing system 10 via management station 22. At management station 22, the administrator may monitor and perform system diagnosis and troubleshooting.

Figure 2:
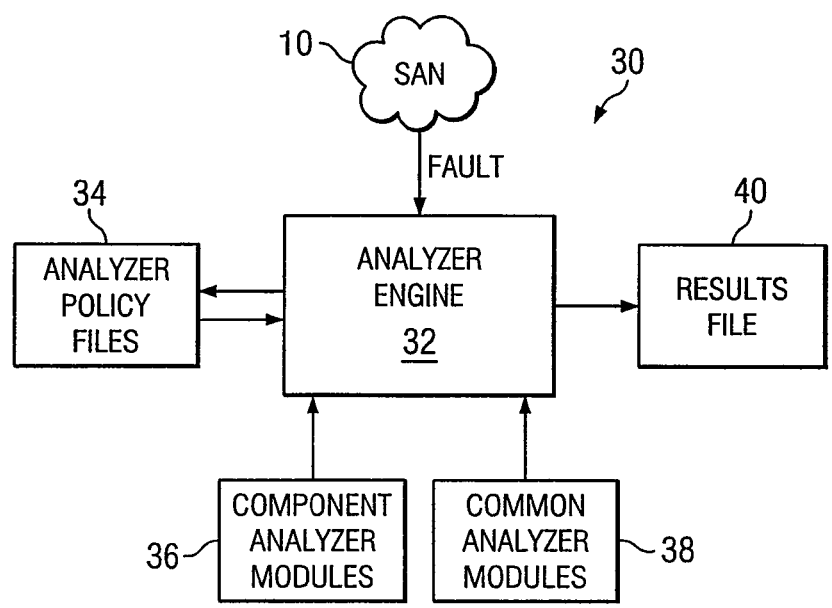
FIG. 2 is a schematic representation of a fault isolation troubleshooting engine according to an example embodiment of the present disclosure.

FIG. 2 is a schematic representation of fault isolation troubleshooting engine 30 including analyzer engine 32. Typically, fault isolation troubleshooting engine 30 receives errors or status notifications from computer components or utilities of enterprise computing system 10 and performs a fault analysis in an attempt to self-diagnose problems in the computing and storage environment. In some embodiments, fault isolation troubleshooting engine 30 includes analyzer engine 32, analyzer policy files 34, common analyzer modules 38, component analyzer modules 36 and results file 40.

Typically, a fault analysis initiates as a result of a fault being received at analyzer engine 32. When a fault occurs within a computer component or utility in enterprise computing system 10, an error or status notification may be generated. In some instances, different fault notifications from related computer components may arrive at analyzer engine 32 in a random fashion. At this point, analyzer engine 32 may be configured to automatically invoke fault isolation troubleshooting engine 30. In some configurations, a network administrator may manually invoke fault isolation troubleshooting engine 30. In either configuration, once the fault analysis begins, analyzer engine 32 invokes the corresponding analyzer policy file 34, which invokes the corresponding troubleshooting logic for the computer components that caused the fault notification to be generated. Such that the troubleshooting logic includes an organized methodology for determining the root cause of the problem and, in some instances, may include the intelligence to identify the root cause of the fault.

In one example of a fault notification, a simple network management protocol (SNMP) trap may be set to send information or status notifications when a certain condition has been met. Once the condition is met, the trap generates an error or status notification such as a fault that is sent to analyzer engine 32. Other examples of faults include warnings, network (NT) events or other similar events that result in an error or status notification being sent within enterprise computing system 10.

In one example embodiment, analyzer engine 32 includes a set of computer instructions such as a computer program that may retrieve or access other programs or modules to self-diagnosis a fault in enterprise computing system 10. The set of computer instructions may be placed in one or more programs and stored on one or more computer components. Alternatively, analyzer engine 32 may be loaded and stored in memory of enterprise computing system 10 for use when a fault is detected.

Analyzer engine 32 may access these different instructions based on information contained in a status notification or error of a fault. Typically, analyzer engine 32 uses the information when accessing a plurality of analyzer policy files 34. Each analyzer policy file 34 may include a predefined protocol or rule in a data file that provides a structured methodology for testing or communicating with one or more computer components and utilities. For example, analyzer policy file 34 may contain one or more analyzer modules that may be associated with one or more computer components or devices. Based on the information contained in the status notification or error, analyzer engine 32 selects one or more analyzer policy file 34 from the plurality of files. For example, if an error contained information relating to a communication fault between server 20 and HBA 18, analyzer policy file 34 may include data files directed to accessing or using modules containing test data for server 20 and HBA 18.

In certain embodiments, the predefined protocol or rules in analyzer policy file 34 contains a list of fault isolation modules. In some instances, analyzer policy file 34 includes an ordered list of enterprise computing system computer components to be contacted, such that each component contacted means the component is tested or communications attempts were made to the component. Generally, the list of fault isolation modules are created and stored in an object-based file including an extensible markup language (XML) metadata interchange format that can be modified and revised based on differences in each particular enterprise computing system 10. Examples of analyzer policy files 34 include a network analysis file, a link analysis file and a storage analysis file used for troubleshooting faults in a storage area network.

After retrieving analyzer policy file 34, analyzer policy file 34 directs analyzer engine 32 to select particular communication or test modules from a set of component analyzer modules 36 and a set of common analyzer modules 38 based on the predefined protocol in analyzer policy file 34.

Component analyzer modules 36 may contain communication or test information to access a computer component for determining the cause of the error or fault within enterprise computing system 10. Typically, component analyzer modules 36 are software programs. Examples of component analyzer modules 36 include an HBA analyzer, a server analyzer, a switch analyzer and a storage analyzer. In some instances, each component analyzer module 36 is further classified according to manufacturer or a particular computer component.

Similarly, common analyzer modules 38 may contain computer utility modules for determining the cause of the error or fault within enterprise computing system 10. Typically, common analyzer modules 38 are software programs. Examples of common analyzer modules 38 include a network analyzer and a link analyzer.

After retrieving one or more analyzer policy file 34 and attempting to communicate with the computer components and utilities, analyzer engine 32 may determine a root cause of the fault and generate results file 40. Results file 40 may include a data file that list the faulty computer component and may trace the path of the fault through the computer component or utility. In some instances, results file 40 include corrective actions or corrective steps for a network administrator to undertake to resolve the fault, such as replacing a faulty computer component.

Results file 40 may support several different reporting formats for presenting the root cause of the fault. For example, the root cause may be show in graphical form such that the probability of each computer component causing the fault is illustrated. In addition, results file 40 may include a file in XML format, a hypertext markup language (HTML) document, a page, electronic mail or any suitable format to present the root cause to a network administrator.

Figure 3:
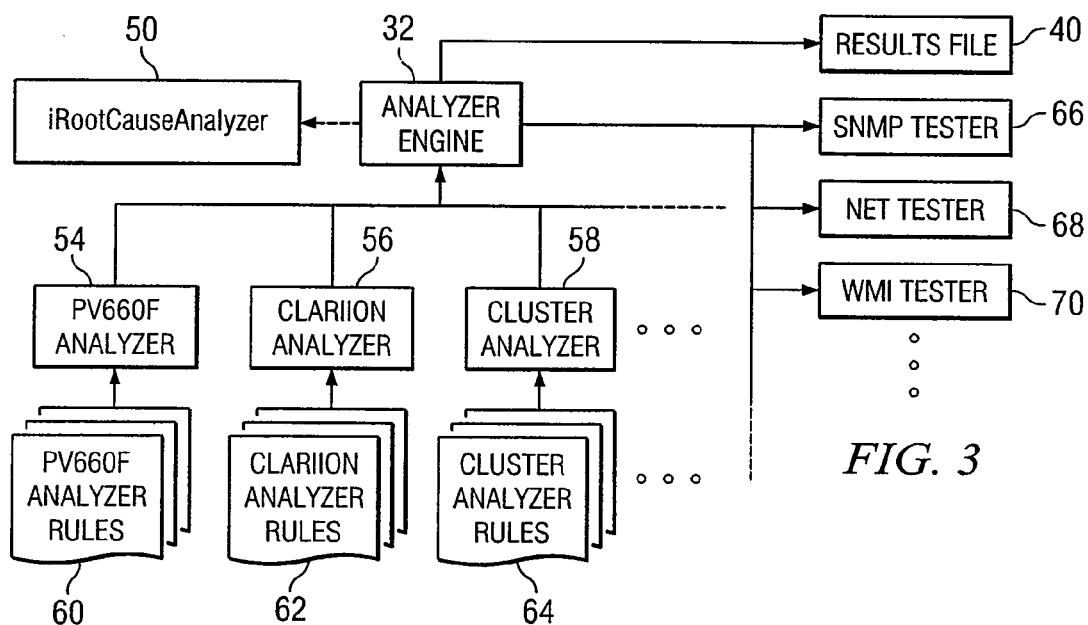
FIG. 3 is a block representation of an example embodiment of an object model according to the present disclosure.

FIG. 3 is a block representation of an example embodiment of an object model of fault engine isolation troubleshooting engine 30. In some example embodiments, analyzer engine 32 may access additional applications or programs such as iRootCauseAnalyzer 50.

iRootCauseAnalyzer is an abstract computer module that analyzes the current configuration of enterprise computing system 10 and may detect new computer components or utilities, which were added to the management application. Based on the current configuration, iRootCauseAnalyzer 50 may cause the development or reconfiguration of analyzer policy file 34, such that analyzer policy file 34 may access or use additional and/or different analyzer modules. In some embodiments, iRootCauseAnalyzer 50 may access a computer system outside enterprise computing system 10 to retrieve troubleshooting logic, e.g., analyzer policy file 34 and/or related analyzer modules. In some instances, iRootCauseAnalyzer 50 may retrieve analyzer policy file 34 and related analyzer modules via the Internet or some other remote link. Typically, iRootCauseAnalyzer 50 conforms analyzer policy file 34 and related analyzer modules to automatically interface with analyzer engine 32. In general, iRootCauseAnalyzer 50 provides an efficient method of supporting field updates to fault.

Based on the error or status notification, analyzer engine 32 receives information regarding certain computer components on enterprise computing system 10. Typically, the information includes several different protocols or rules that pertain to testing or analyzing the particular computer component. For example, PV660F Analyzer 54 contain sets of rules, such as PB660F Analyzer Rules 60, that may be used to test or communicate with the computer component depending on the error or status notification received. In other examples, Clariion Analyzer 56 includes a set of Clariion Analyzer Rules 62 and Cluster Analyzer 58 includes a set of Cluster Analyzer Rules 64.

Based on the selected rules or protocol, analyzer engine 32 may begin accessing different testing modules such as SNMP Tester 66, Net tester 68 and Windows Management Instrumentation (WMI) tester 70, or any suitable test module that may test a computer component or utility on enterprise computing system 10. For example, WMI tester 70 may be a general purpose testing tool that allows analyzer engine 32 to troubleshoot programs and other computer code by checking queries, classes, or interfacing with different computer components or utilities.

After analyzer engine 32 has gathered sufficient information to determine the root cause of the fault, results file 40 may be generated for a user. Typically, results file 40 includes a determination of the faulty computer component or utility. In some instances, results file 40 provides notification to the network administrator and provides instructions for correcting the problem.

Figure 4:
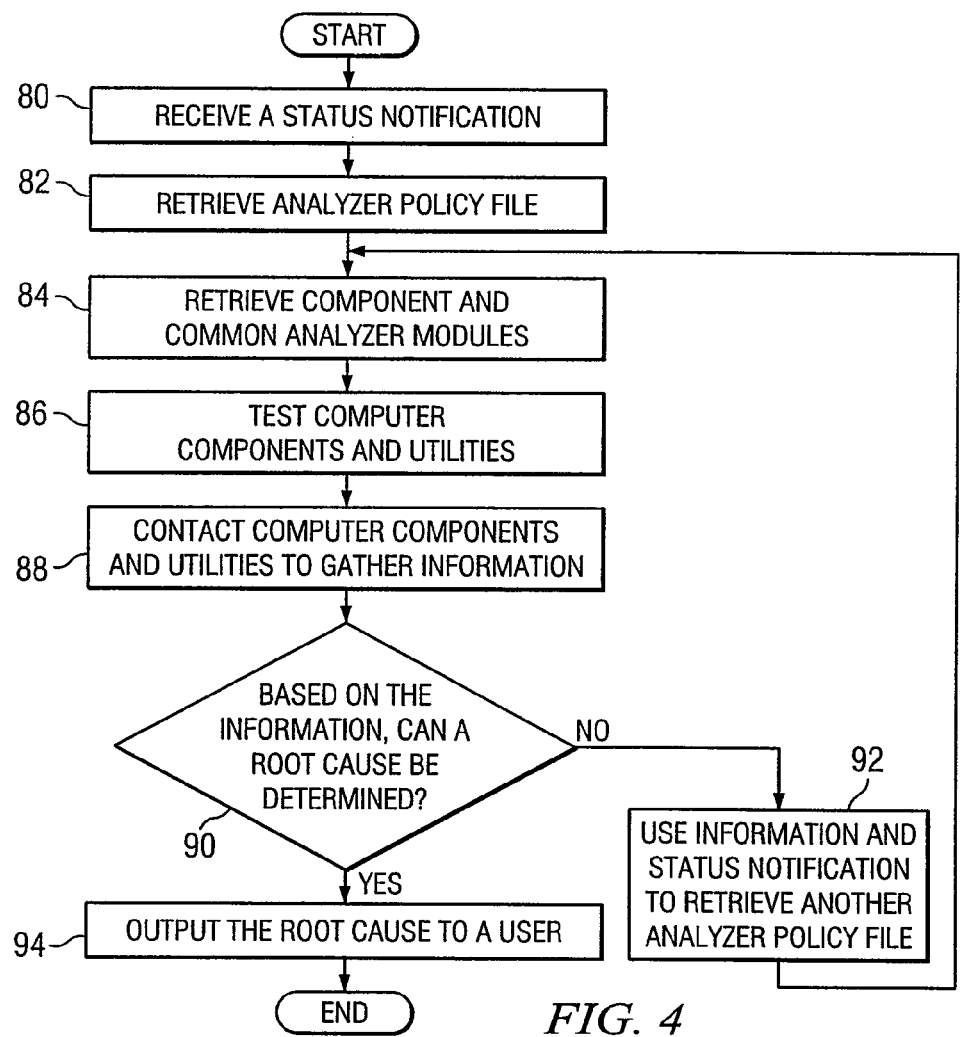
FIG. 4 illustrates a flowchart of an example embodiment of a method for troubleshooting errors in an enterprise computing system according to the present disclosure.

FIG. 4 illustrates a flowchart of an example embodiment of a method for troubleshooting errors in enterprise computing system 10. At block 80, analyzer engine 32 receives a status notification or error from a computer component or utility within enterprise computing system 10. For example, a fault occurring at HBA 18 may cause one or more status notifications to be sent to analyzer engine 32.

Following receipt of the status notification or error, analyzer engine 32 accesses a plurality of analyzer policy files 34, at block 82. Based on the information contained in the status notification or error, the appropriate analyzer policy file 34 is selected. In certain embodiments, more than one analyzer policy file 34 is retrieved and used to troubleshoot the fault in enterprise computing system 10.

Based on the information in the analyzer policy file 34, the method proceeds to retrieve component analyzer modules 36 and common analyzer modules 38 for all of the computer components and utilities listed in analyzer policy file 34, at block 84. After retrieving the modules or testing protocol for the computer components and computer utilities, analyzer engine 32 via the analyzer modules begins to attempt communications with or testing of each computer component or utility, at block 86. Typically, each attempt results in information being gathered that is used to determine a root cause for the error or group of errors. Analyzer engine 32 may utilize all, some or none of the information when diagnosing a root cause of the fault.

At block 90, the methods determine whether a root cause of the fault can be determined based on the information received from the communications and testing. If a root cause cannot be determined, analyzer engine 32 may retrieve one or more additional analyzer policy files 34 at block 92. Analyzer engine 32, however, selects another analyzer policy file 34 based on the errors or status notifications and the information received from the communications and testing. Hence, analyzer policy file 34 may include different test protocols or modules for diagnosing the root cause of the fault.

Next, the method returns to block 84, wherein analyzer engine 32 via analyzer policy file 34 may retrieve additional component analyzer modules 36 and common analyzer modules 38. Analyzer engine 32 may gather additional information based on the contacting or testing with the additional modules, at block 88. Again, the method determines whether a root cause may be determined based on the information. Because the method continues to retrieve another analyzer policy files 34 based on the additional information received from the previous analyzer policy file 34, the method may be considered a recursive testing method.

The method may continue to perform recursive testing of enterprise computing system 10 until a root cause is determined. In other instances, the method may determine the fault to a high probability based on a pre-defined percentage and thus list the possible causes of the fault based on a probability scale. However, the method may reach a pre-determined number of attempts to determine the root cause and thus proceed to output the possible root causes.

At block 94, the method outputs the root cause to the user. Generally, the output is a results file 40 that may identify the cause of the fault. Additionally, the results file 40 may include corrective steps to resolve the fault and may even list some potential preventative maintenance steps to prevent possible errors or faults in the future.

Although the disclosed embodiments have been described in detail, it should be understood that various changes, substitutions and alterations can be made to the embodiments without departing from their spirit and scope.

What is claimed is:

1. A method for automatically troubleshooting errors in a computing system, the method comprising:
   receiving an error notification associated with the computing system;
   automatically selecting an analyzer policy file for determining a cause of the received error notification;
   wherein the selected analyzer policy file has a predefined protocol identifying a set of analyzer modules usable by the selected analyzer policy file for determining the cause of the error notification;
   determining a configuration change to the computing system; and
   in response to determining the configuration change to the computing system, automatically modifying the predefined protocol for the selected analyzer policy file to modify the set of analyzer modules usable by the selected analyzer policy file for determining a cause for a subsequent error notification.

2. The method of claim 1, wherein determining a configuration change to the computing system comprises detecting a new computer component or utility.

3. The method of claim 1, wherein automatically modifying the selected analyzer policy file comprises developing or reconfiguring the selected analyzer policy file.

4. The method of claim 1, further comprising:
   receiving the error notification from a first component of the computing system;
   automatically attempting to communicate with a second component of the computing system based on troubleshooting logic within the selected analyzer policy file; and
   automatically determining a cause for the error notification based on the troubleshooting logic in the selected analyzer policy file and based on information obtained in connection with the attempt to communicate with the second component of the computing system.

5. The method of claim 1, wherein the error notification comprises simple network management protocol (SNMP) traps.

6. The method of claim 1, wherein the error notification comprises network (NT) events.

7. The method of claim 1, further comprising providing output for a user that identifies the cause of the error notification.

8. The method of claim 1, further comprising, in response to determining the cause for the error notification, identifying corrective steps for the computing system.

9. A fault isolation troubleshooting system for use in a computing system, comprising one or more tangible computer readable media having stored thereon:
   a plurality of analyzer policy files, each analyzer policy file including troubleshooting logic for determining causes of errors associated with the computing system;

one or more instructions comprising an analyzer engine operable to receive an error notification, select the analyzer policy file based on the received error notification, and use the troubleshooting logic of the selected analyzer policy file to identify the cause of the error notification; and one or more instructions comprising an updating engine operable to determine a configuration change to the computing system, and in response to determining the configuration change to the computing system, automatically modify the troubleshooting logic of the selected analyzer policy file.

10. The system of claim 9, wherein determining a configuration change to the computing system comprises detecting a new computer component or utility.

11. The system of claim 9, wherein:

the selected analyzer policy file has a predefined protocol identifying a set of analyzer modules usable by the selected analyzer policy file for determining a cause of an error notification; and automatically modifying the troubleshooting logic of the selected analyzer policy file comprises modifying the set of analyzer modules usable by the selected analyzer policy file for determining a cause of an error notification.

12. The system of claim 9, wherein the error notification comprises simple network management protocol (SNMP) traps.

13. The system of claim 9, wherein the error notification comprises network (NT) events.

14. The system of claim 9, further comprising a user interface for providing output to a user that identifies the cause of the error notification.

15. The system of claim 9, wherein the analyzer engine is further operable to identifying corrective steps for the computing system regarding the identified cause of the error notification.

16. A method for automatically troubleshooting errors in a computing system, comprising:

receiving a first error notification associated with the computing system;

from a plurality of analyzer policy files for determining causes of error notifications, automatically selecting a first analyzer policy file based at least on the received first error notification, the first analyzer policy file having a predefined protocol identifying a first set of analyzer modules usable by the first analyzer policy file for determining the cause of the first error notification;

automatically determining a cause for the first error notification using the first set of analyzer modules associated with the first analyzer policy file;

receiving a second error notification associated with the computing system;

from the plurality of analyzer policy files for determining causes of error notifications, automatically selecting a second analyzer policy file based at least on the received second error notification, the second analyzer policy file having a predefined protocol identifying a second set of analyzer modules usable by the second analyzer policy file for determining the cause of the second error notification, second set of analyzer modules having at least one different analyzer module than the first set of analyzer modules;

automatically determining a cause for the second error notification using the second set of analyzer modules associated with the second analyzer policy file;

determining a configuration change to the computing system; and in response to determining the configuration change to the computing system, automatically modifying the predefined protocol for at least one of the first and second analyzer policy files to modify the set of analyzer modules usable by at least one of the first and second analyzer policy files for determining a cause for a subsequent error notification.

17. The method of claim 16, wherein determining a configuration change to the computing system comprises detecting a new computer component or utility.

* * * * *